United States Patent
Milner

(10) Patent No.: US 7,054,510 B1
(45) Date of Patent: May 30, 2006

(54) HANDWRITING RECOGNITION SYSTEM

(75) Inventor: Benjamin P Milner, Norwich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/914,262

(22) PCT Filed: Mar. 21, 2000

(86) PCT No.: PCT/GB00/01052

§ 371 (c)(1),
(2), (4) Date: Aug. 24, 2001

(87) PCT Pub. No.: WO00/57349

PCT Pub. Date: Sep. 28, 2000

(30) Foreign Application Priority Data

Mar. 24, 1999  (EP) ................... 99302270

(51) Int. Cl.
*G06K 9/22*  (2006.01)

(52) U.S. Cl. ..................... 382/313; 382/314
(58) Field of Classification Search ............. 382/119, 382/120, 121, 122, 123, 187, 188, 189
See application file for complete search history.

(56) References Cited

U.S. PATENT DOCUMENTS

| | | | | |
|---|---|---|---|---|
| 3,818,443 A | * | 6/1974 | Radcliffe, Jr. | 382/121 |
| 4,736,445 A | * | 4/1988 | Gundersen | 382/120 |
| 5,577,135 A | * | 11/1996 | Grajski et al. | 382/253 |
| 5,768,417 A | * | 6/1998 | Errico et al. | 382/186 |
| 5,781,661 A | * | 7/1998 | Hiraiwa et al. | 382/188 |
| 5,802,205 A | * | 9/1998 | Emico et al. | 382/187 |
| 5,854,855 A | * | 12/1998 | Errico et al. | 382/187 |
| 6,335,727 B1 | * | 1/2002 | Morishita et al. | 345/179 |
| 6,556,712 B1 | * | 4/2003 | Loudon et al. | 382/187 |

FOREIGN PATENT DOCUMENTS

| WO | WO 97/16799 | 5/1997 |
|---|---|---|
| WO | WO 97/44758 | 11/1997 |

\* cited by examiner

*Primary Examiner*—Samir Ahmed
*Assistant Examiner*—Brian Le
(74) *Attorney, Agent, or Firm*—Nixon & Vanderhye P.C.

(57) ABSTRACT

In order to improve the accuracy of recognition of handwritten input using a stylus, output signals from a plurality of accelerometers representing x and y axis acceleration and deceleration are sampled at a predetermined rate and passed through a digital bandpass filter to remove high frequency components and dc components arising from gravity. X and y vectors derived from the original x and y input signals are passed to a classifier using a hidden Markov model. Bandpass filtering improves the robustness of the interpretation of the vectors against stored templates which may be templates of individual characterizations or of whole words.

1 Claim, 5 Drawing Sheets

HANDWRITING RECOGNITION SYSTEM

BACKGROUND OF THE INVENTION

1. Field of the Invention

The present invention relates to a handwriting recognition system and more particularly to a hardware and an algorithm for implementing such a system.

2. Related Art

In PCT application number GB98/0316 (Publication No. WO99/22338) there is disclosed a portable computer in the form of a pen-type casing. Incorporated within the casing is at least one accelerometer which is used to detect movement of the pen with respect to its environment. By using the instrument for handwriting it is possible to effect data entry or transmission of signals reflecting movement, the user using either a pen tip mounted switch or a finger operated switch to indicate that movement is effecting a written input.

There are many other pen-type input devices on the market in addition to stylus scroll pallets typically used in so-called palm top computers where handwriting recognition has been used. Such devices often require very precise movement which may not reflect natural handwriting movements for the user. One of the problems which makes characteristic handwriting recognition difficult is that while the underlying movement made by an individual to represent a particular letter may be consistent an element reflecting user movements due to stress and other factors will be present.

BRIEF SUMMARY OF THE INVENTION

According to an exemplary embodiment of the present invention there is provided a handwriting recognition system comprising means responsive to input analogue signals representative of movement of a handheld writing device, sampling means to provide signals representative of the acceleration of the writing device in at least x axis and y axis channels at a predetermined capture sampling rate, and filtering means to remove dc level components and to provide smoothing of the output whereby signals representative of movement of the pen over a period are supplied to a classifier for comparison with a template representative of characters formed.

The classifier may use hidden Markov modelling (HMM) techniques using a large number of states to determine the character defined by movement. The system may include an input indicative of a user's intention that the movement is representative of character writing.

According to a feature of the present there is provided a method of analysing signals from a moving handheld device, the method comprising sampling signals at a predetermined rate, passing signals through a bandpass filter to remove dc level and excess acceleration components, sampling the filtered output to provide a series of vectors representing the position of the handheld device at periodic intervals and using a classifier to compare the sample sets with predetermined templates to determine the character for output.

BRIEF DESCRIPTION OF THE DRAWINGS

A handwriting recognition system in according with the invention will now be described by way of example only with reference to the accompanying drawing of which.

DETAILED DESCRIPTION OF EXEMPLARY EMBODIMENTS

Figure 1:
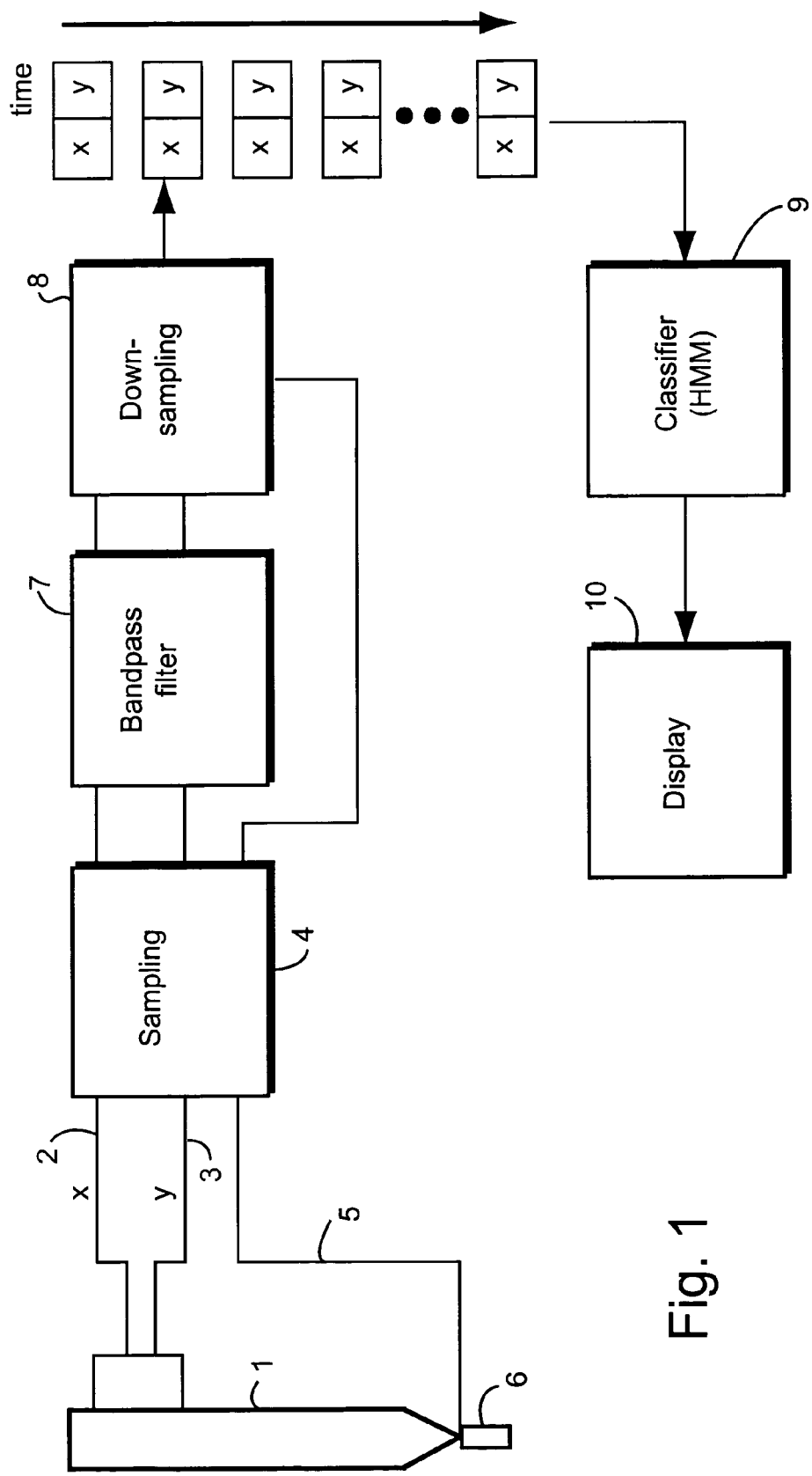
FIG. 1 is a block schematic diagram of the system.

Referring first to FIG. 1, an input device 1 such as a stylus produces x and y vector streams 2 and 3 which are fed into a sampling unit 4. The outputs x and y are generally from accelerometers or other position sensing devices within the stylus 1. Also feeding the sampling unit 4 is an output 5 from a switch indicated here as being in the nib section of the stylus 1 such that contact between the switch 6 and a surface is indicative of the stylus being used in a writing mode. It will be appreciated that the nib switch 6 when incorporated in a non-surface contacting stylus, such as that disclosed in the previously referred PCT application, may be replaced by a user operable switch.

The output of the sampling unit 4, which samples the incoming streams at 60 Hz for example, is passed to a bandpass filter arrangement 7 and thence to a down sampling unit 8 which produces digitised vectors x and y over a period of time. The x and y vectors are passed to a classifier 9, which uses a hidden Markov model to carry out a comparison between the vectors and templates representing written characters. The classifier 9 may be arranged to output to a visual display 10.

More specifically, the stylus 1 for example comprises a simple plastic casing containing the electronics for transferring information to a PC. Two accelerometers mounted in the stylus, for example, are used to produced the x and y outputs. The nib switch is a simple on/off switch connected to determine when pressure is being applied to the pen nib and can therefore detect when a pen for stylus 1 is writing.

Figure 2:
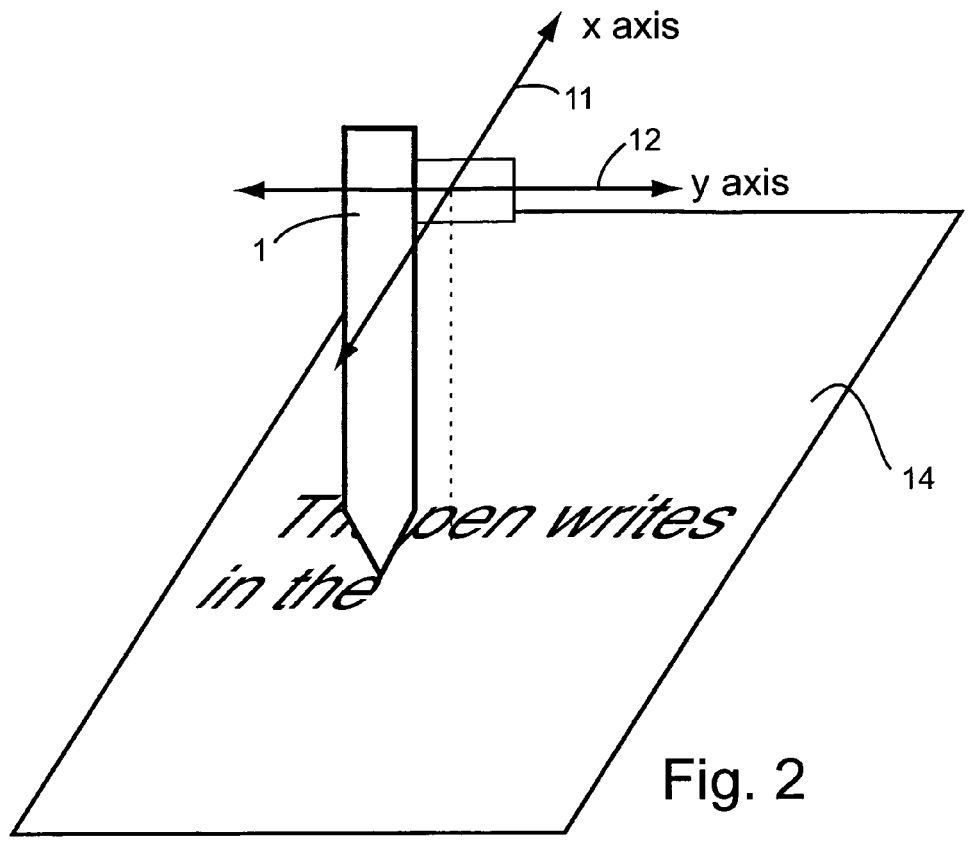
FIG. 2 shows relative positioning of the x and y axis of the handwriting device of FIG. 1.
Figure 3:
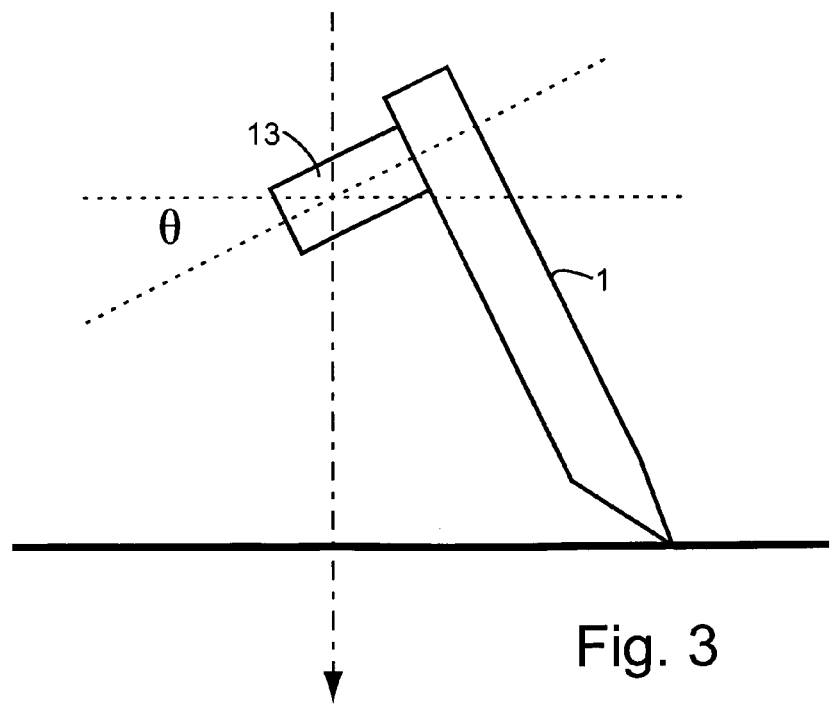
FIG. 3 is a schematic diagram of the handheld writing device of FIG. 1 in a particular position.

Turning briefly to FIG. 2, the two accelerometers mounted in the top of the pen measure acceleration across their plane such that effectively they measure acceleration along the x axis 11 and the y axis 12 of the writing surface 14. The acceleration measured by the sensors is made up of two components, acceleration due to gravity and the acceleration as a result of stylus movement. It will be appreciated that the acceleration due to gravity is always present, such that when the pen is exactly horizontal both sensors would measure acceleration of 1 g. As the angle of the pen to the horizontal changes (as shown for example in FIG. 3), the accelerometers are subject to Sin θ×1 g where θ is the inclination angle of the stylus 1.

The other component, acceleration as a result of the pen moving is produced by the acceleration and deceleration effect as the user writes.

The acceleration of the two sensors $x_{total}$ and $y_{total}$ can be expressed as $$y_{total} = y_g + y_{movement} \text{ and } x_{total} = x_g + x_{movement}$$

The remaining items of FIG. 1 are incorporated in a computer unit, for example a PC, and three signals, as previously indicated, 2, 3 and 5 being the two acceleration signals and binary signal from the pen switch are provided to the PC.

In one embodiment the two acceleration signals are read into a normal PC using an RS232 port and the binary switch signal by means of the games port of a sound card.

The sampling section must sample sufficiently regularly to capture the movement of the pen but preferably should not over-sample, which would result in a waste of processing and storage within the PC. It has been found satisfactory for the purposes of the current embodiment to sample at a rate of 60 Hz. The acceleration signals for each channel are read in as two byte words giving a dynamic range for each acceleration signal from 0 to 65535. The pen nib switch is similarly sampled at the same rate.

As previously mentioned, the accelerometer signals are partly dependent on a component of the earth's gravitation field passing through the accelerometer of the stylus 1. This results in an almost constant dc level present on the output corresponding to the average pen angle $\theta$ while writing. The bandpass filter 7 is thus arranged to filter the signals from the two accelerometers to remove the offsets. Additionally, the bandpass filter smoothes the output from the sensors thus correcting for instability introduced by the user so that the smoothed output from the sensors increases robustness and facilitates matching between the x and y vectors and stored templates.

Figure 4:
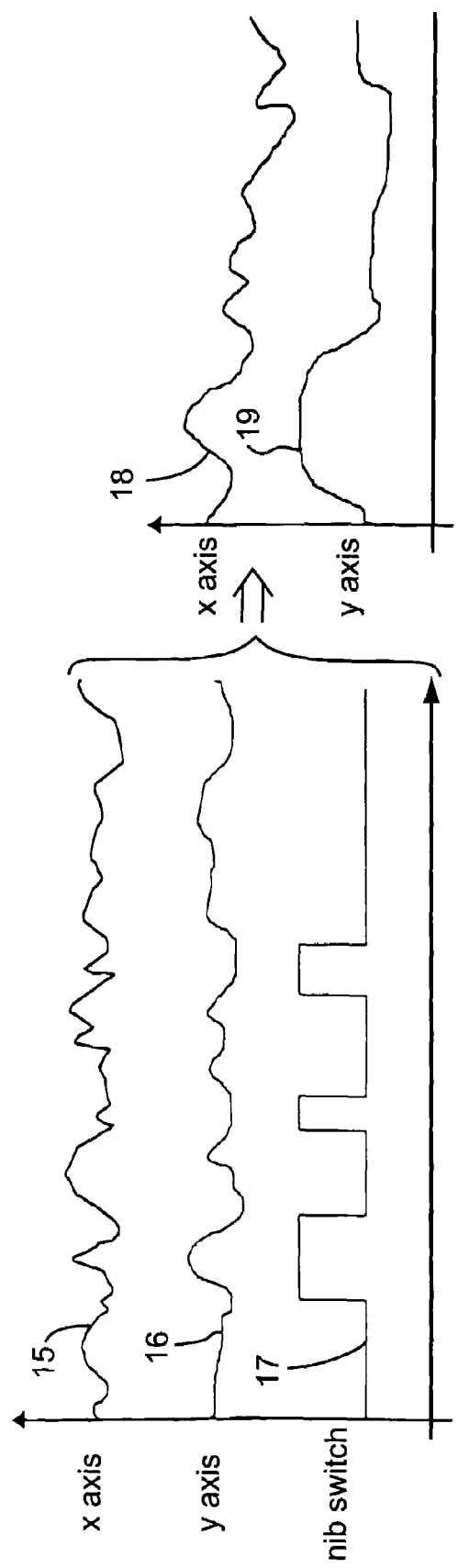
FIG. 4 shows relative input and output vector streams from the system of FIG. 1.
Figure 6:
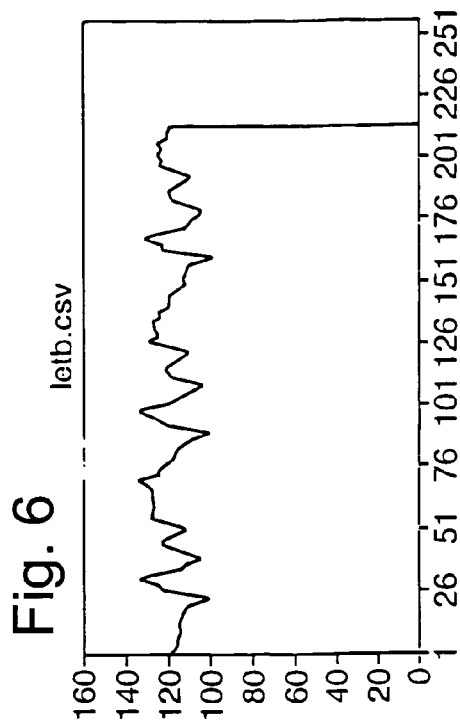
FIGS. 5 to 9 show comparative templates for a number of different letters.
Figure 8:
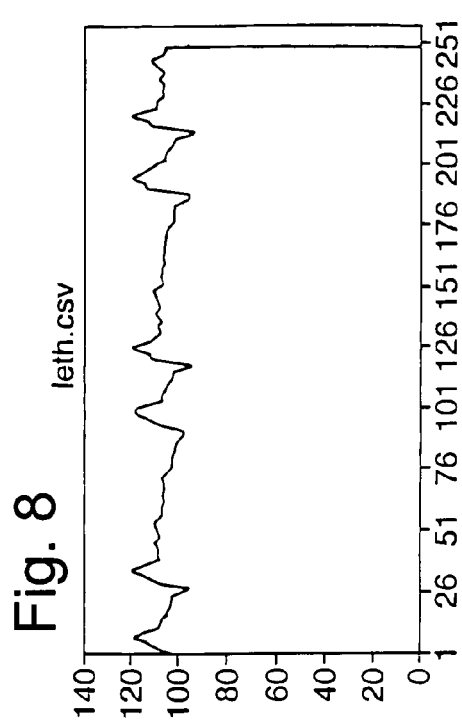
Figure 5:
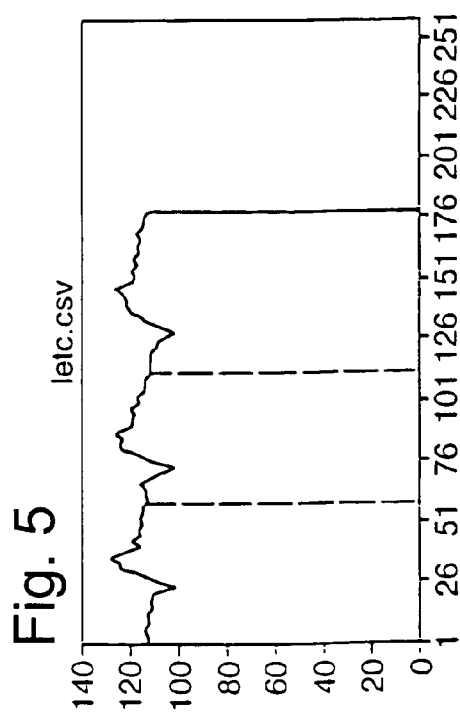
Figure 7:
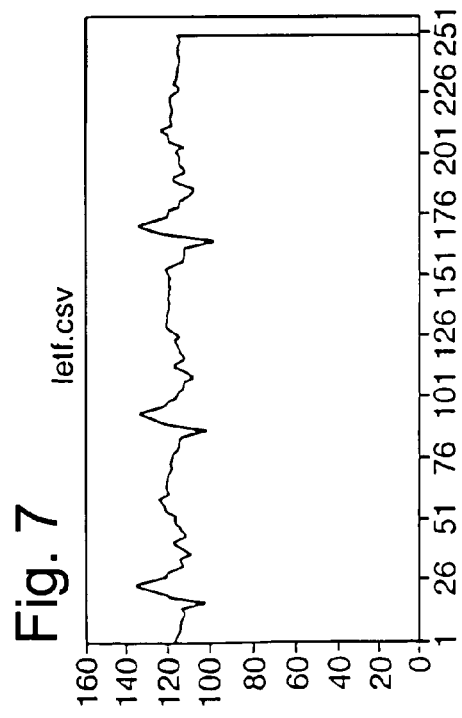

Turning now to FIG. 4, for each sample received on the PC from the accelerometers, the pen nib switch (or manually operable switch) indicates whether the stylus 1 was being used in a writing mode or not. The down sampling process 8 uses the information to down sample acceleration samples and to retain only those when it was known that the stylus 1 was writing. Thus, consider FIG. 4, assuming that the x axis and y axis vectors are as shown at 15 and 16, then the down sampling vectors need only be taken into account when the nib switch signal indicator 17 is high. This will reduce the number of samples significantly so that the output from the down sampling process is a time series of two dimensional vectors x and y as indicated at 18 and 19.

Having completed processing of the acceleration measurement from the stylus 1 the vector stream is passed to the classifier stage 9 which takes in a series of vectors representing the acceleration measurements made within a given word.

These are then compared to a set of templates which cover the range of words within the system vocabulary and the word which matches most closely with the unknown input word is deemed the recognised word. In this system the classifier is a hidden Markov model. Such models have been widely used in speech recognition and using a large number of states in the hidden Markov model will give the best performance for corresponding handwriting recognition.

The display 10, which displays the output from the PC allows display of a word, for example, on a screen.

While the above handwriting recognition system is intended for use with a series of known words which, depending on the system vocabulary entered into the PC, may be a large number, it will be possible to use the same kind of system to validate single character entry. Using single character recognition and using cursive entry it is still possible to build individual words which may not be present in the vocabulary. There may be a lower level of confidence in words created rather than template determined. However, over time, the vocabulary may be expanded where multiple entries of the same word have occurred such that higher confidence levels may be achieved.

A typical single accelerometer output can be seen respectively for the letters c, b, f and h in FIGS. 5 to 8. In each case the template developed here shows three entries on a single accelerometer for each of the letters.

Figure 9:
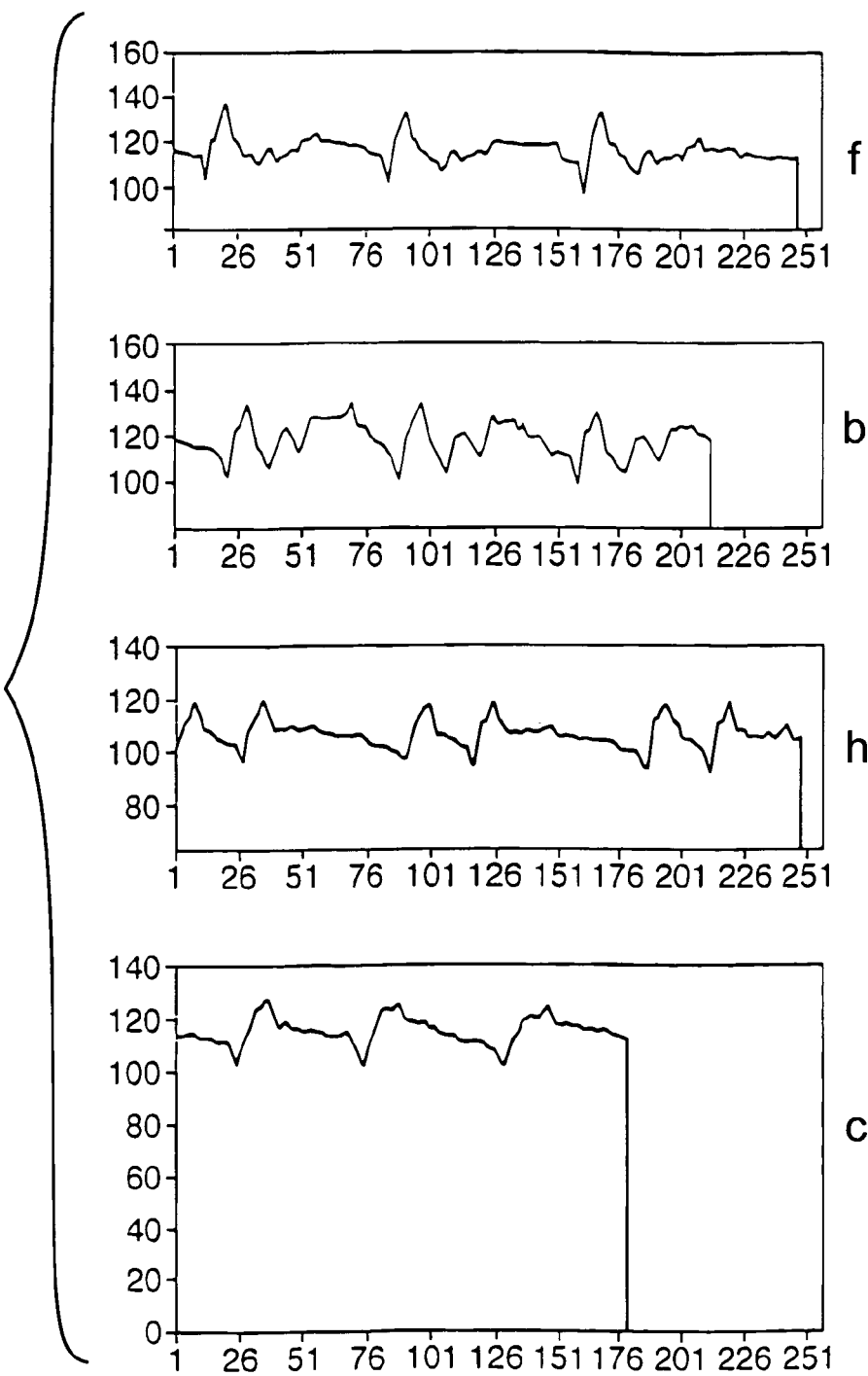

In FIG. 9, f, b, h and c are shown in comparison so that a suitable template for comparison may be derived. It will be appreciated that the combination of an x accelerometer trace and a y accelerometer trace will serve further to emphasise the difference between each input letter.

Bandpass filtering in digital form to remove dc components and high frequency components increases the reliability of the recognition process and therefore the reliability of the interpretation of the stylus input 1. It will be appreciated that where the stylus 1 carries other components, for example an internal processing arrangement, some of the functions may be transferred from the PC to the stylus 1. All of the components of sampling, bandpass filtering, down sampling and classifying can be implemented in a suitable computer program.

What is claimed is:

1. A method of analyzing signals from a moving handheld device, the method comprising:
    sampling signals at a predetermined rate,
    passing signals through a bandpass filter to remove dc level and high frequency components,
    sampling the filtered output to provide a series of vectors representing the position of the handheld device at periodic intervals; and
    using a classifier to compare the sample sets with predetermined templates to determine the character for output.

* * * * *